(No Model.) 2 Sheets—Sheet 1.
J. W. HYATT.
PROCESS OF PURIFYING WATER.
No. 369,288. Patented Aug. 30, 1887.
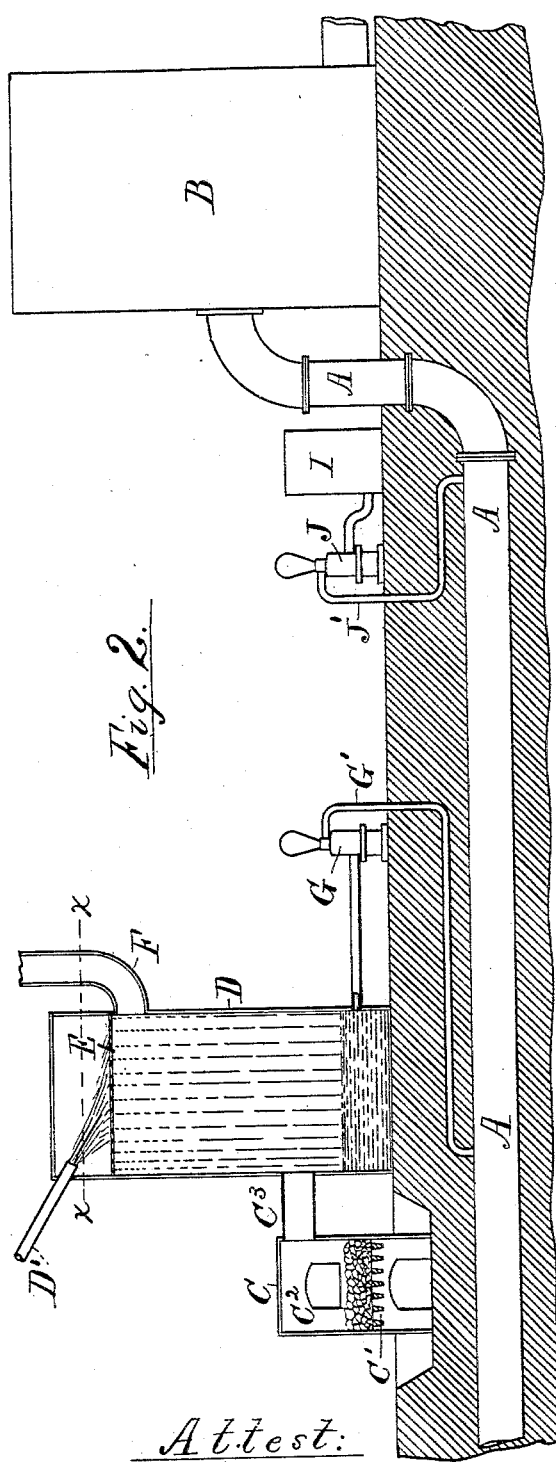
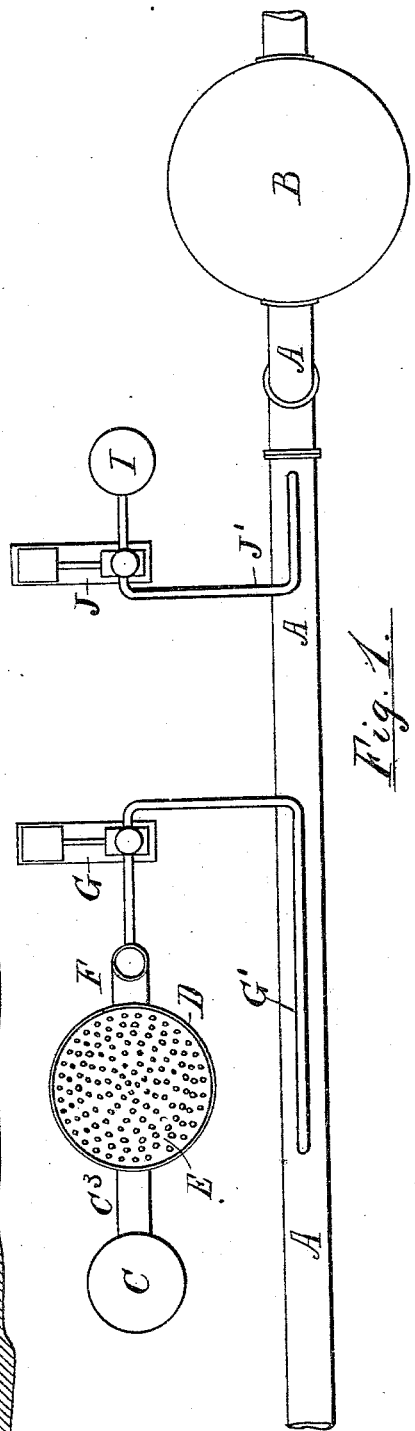
Fig. 1.
Fig. 2.
Attest:
L. Lee
Henry J. Theberath
Inventor.
J. W. Hyatt per Crane & Miller
Attys

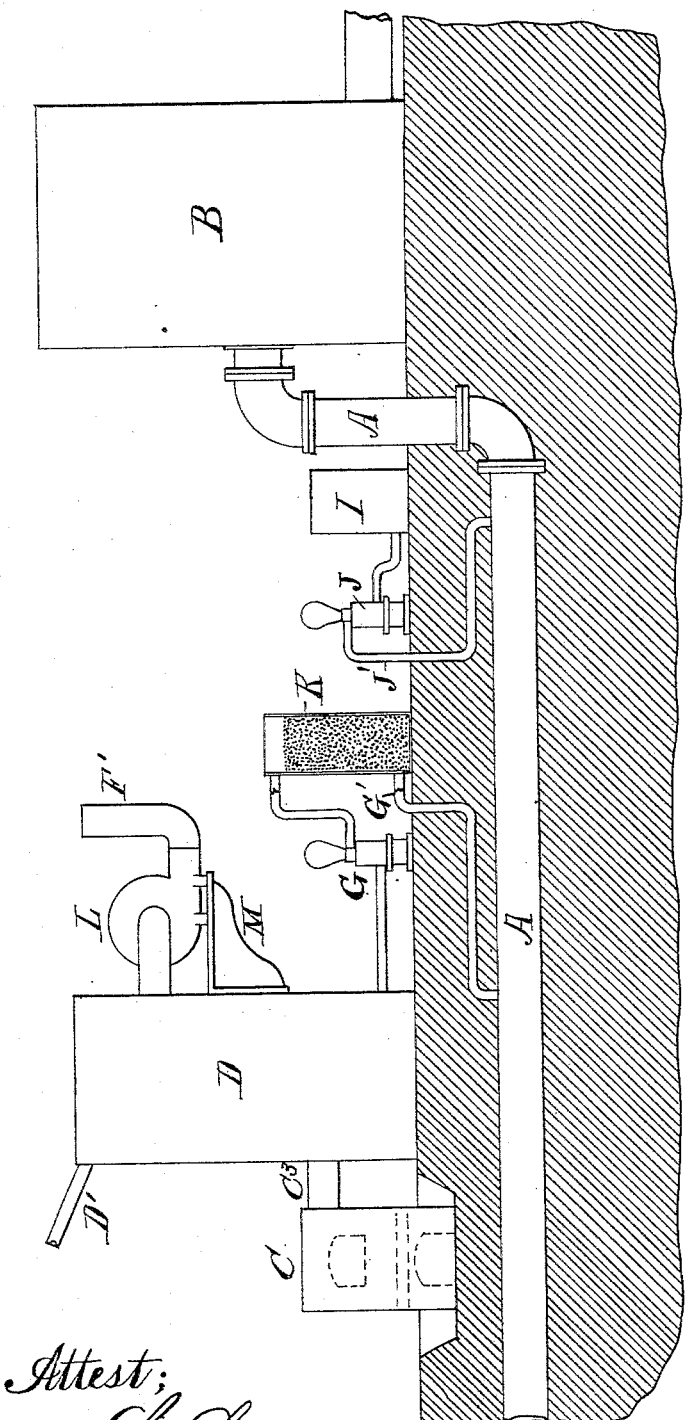

UNITED STATES PATENT OFFICE.

JOHN W. HYATT, OF NEWARK, NEW JERSEY, ASSIGNOR TO THE HYATT PURE WATER COMPANY, OF SAME PLACE.

PROCESS OF PURIFYING WATER.

SPECIFICATION forming part of Letters Patent No. 369,288, dated August 30, 1887.

Application filed April 28, 1886. Serial No. 200,406. (No model.)

*To all whom it may concern:*

Be it known that I, JOHN W. HYATT, a citizen of the United States, residing at Newark, Essex county, New Jersey, have invented certain new and useful Improvements in the Art of Precipitating Impurities in Water, fully described and represented in the following specification and the accompanying drawings, forming a part of the same.

The object of my invention is to purify muddy or cloudy waters holding in suspension fine clay, sand, or other foreign substances in so fine a form that they cannot be wholly removed by filtration. By my improvement such muddy or discolored waters may be not only freed from any matter which is liable to form a sediment therein, but may be rendered clear and sparkling by the removal of such visible but impalpable particles.

My invention consists in a continuous process for the formation of carbonate of lime in a moving current of water while flowing under pressure through a closed pipe for the precipitation of visible suspended impurities in the water. When thus precipitated, the impurities may be removed from the water by filtration or by means of a settling-tank, as is already well known.

In the practice of my invention the visible substances suspended in the water are not subjected to chemical treatment, but two separate chemical agents are introduced into the water separately to superinduce a precipitate upon such visible matters to mass them together or entangle them in such manner that they may be removed by filtration.

The invention consists, first, in impregnating the water by injection into the moving current with either one of the elements of carbonate of lime, (namely, carbonic acid or lime,) diffusing such element in the water and then adding the other element to form a precipitate.

It consists, secondly, in a special method of preparing the carbonic acid by the combustion of carbonaceous fuel and the diffusion of the carbonic-acid gas in water, which is afterward injected into the moving current of impure water.

It also consists in a method of forming bicarbonate of lime for the first impregnation of the water to diminish the amount of lime required in the last stage of the process.

My invention may be applied practically to the removal of impurities from water in the conduits of an aqueduct by pumping either of the necessary elements for the formation of carbonate of lime into the conduit, allowing such element to diffuse itself through the water, pumping in the other element, and then removing the precipitate by filtration without diminishing the pressure or interrupting the flow of the current.

I am well aware that it is not new to form a precipitate of lime in a solution when either of the elements is already present by the introduction of the other elements; but such an operation differs essentially from my process, in which both the elements are intentionally applied in succession to the water, not for the purpose of removing either element, but for the purpose of entangling the pre-existing impurities with the precipitate when formed. It will thus be seen that the carbonate of lime when formed acts essentially as a mechanical agent to remove the previous impurities from the water, and that the process differs radically from any in which the coagulant operates directly or by chemical reaction upon any of the impurities to alter either their constitution or their mechanical structure.

My improvements will be understood by reference to the annexed drawings, which show an apparatus adapted to generate carbonic-acid gas by the combustion of fuel, and to inject the two elements of carbonate of lime into the water while under pressure.

Figure 1 is a plan of a main conduit-pipe and the necessary fixtures. Fig. 2 is an elevation of the same, partly in section, as indicated where the lines are hatched; Fig. 3, an alternative construction in elevation.

A is the conduit conducting water under pressure to a filter, B, and A' is the outlet by which the purified water is conducted from the filter under substantially the same pressure.

C is a furnace provided with grate C', supplied with carbonaceous fuel, which mingles with the oxygen of the air in the combustion-chamber $C^2$ and pipe $C^3$ for conducting the products of combustion to a closed acid-chamber, D. The pipe $C^3$ discharges into the lower part of the chamber, and a pipe, F, is provided near the upper part of the same to discharge the waste gases therefrom. E is a perforated screen in the top of such chamber, through which a spray of water from pipe D' is showered downward through the gases with which the chamber is filled by pipe C³. By such mingling the water absorbs the carbonic-acid gas and collects in the bottom of the chamber, from whence it is drawn by a pump, G, and is injected into the conduit A in a regulated volume by the pipe G'. The acid solution is then carried along with the current in the conduit for a sufficient distance to diffuse itself through the impure water therein, and a solution of lime contained in a tank, I, is then injected into the conduit by a pump, J, through a pipe, J'. The union of the lime with the carbonic acid already charged in the water produces a precipitate in the water which entangles mechanically the other impurities previously present therein, and the removal of such precipitate therefore effects the removal from the water of all matters capable of filtration therefrom.

In the drawings the carbonic acid is shown first applied to the impure water and the lime afterward mingled therewith; but the effect would be the same if the lime were first applied, and it is therefore immaterial in what order the carbonic acid and lime are applied, provided their joint operation is effected as described; neither is it material to the practice of my invention how the carbonic acid be prepared for application to the water, although, as a single pound of carbon burning in contact with the atmosphere produces three pounds of carbonic acid, I consider the means shown herein as economically adapted for practical use.

Where crude limestone or marble-dust is available, and the cost of calcining the same to produce lime is a material consideration, a certain proportion of the lime may be saved by first forming a carbonate of lime with the carbonic-acid solution. Such carbonate may be cheaply produced by forcing the acid solution through a tank containing pulverized limestone or marble-dust on its course to the conduit A. The mingling of such liquid with the water then necessitates a smaller proportion of the lime to form carbonate of lime and produce the desired precipitate. The means for thus producing the carbonate are shown in Fig. 3, where, in addition to the apparatus illustrated in Fig. 2, a tank, K, is shown interposed between the pump G and the conduit A, the tank being nearly filled with the powdered carbonate of lime, and the acid solution being delivered thereto at or near the top and discharged from the bottom through the pipe G' into the conduit A.

In Fig. 3 is also shown an attachment for securing a forced draft through the acid-chamber D, which in practice would be necessary to secure a draft to the furnace C. This attachment consists in a fan-blower, L, shown mounted upon a bracket, M, upon the side of the chamber D adjacent to the waste-pipe F. The latter is connected with the suction-opening of the blower, and the nozzle of the latter is provided with an uptake, F', which serves as a chimney. The cooling of the gases by their contact with the water reduces them to such a temperature as to operate in the blower without any injury to the latter.

I am aware that lime has been added to water containing lime-salts to produce a precipitate which has afterward been filtered out, and that in such process carbonic acid has been afterward supplied to the water to precipitate the excess of lime. A succeeding filtration is then employed to remove the carbonate of lime. By this method both the lime and the carbonic acid act chemically upon elements previously existing in the water, and two filtrations are required to effect the removal of the separate precipitates thus formed. My invention differs essentially from such a process by acting upon the impurities in the water mechanically and not chemically, the two agents being applied for the purpose of reacting upon one another to produce a precipitate to entangle the suspended impurities in the fluid. But one filtration is required to remove this precipitate. My invention further differs from such a process in its operating continuously upon a moving current of fluid under pressure within a pipe, while the process to which I have referred has been used only with settling-tanks, and would therefore be slow and expensive of application to large volumes of water. My invention is particularly adapted to the removal of the impalpable suspended impurities, which cannot be removed from the water by mere filtration, and which, as they give it a perceptible color, render it offensive to the sight, whether injurious in their character or not. I therefore disclaim any process involving the use of lime first and carbonic acid afterward when the lime produces a precipitate in the water which is removed by filtration before the application of carbonic acid.

I am aware that it is common to soften hard water containing lime in solution by a variety of other chemical reactions adapted to form a precipitate with such lime, which is afterward filtered from the water, and that such chemical reagents are applied to the water while moving through a closed pipe; and I do not therefore claim such methods of operation or means of purifying water, except in combination with the other elements of my invention set forth herein. I therefore wholly disclaim the mere formation of a precipitate of carbonate of lime in water, or the filtration of such a precipitate from the water, limiting my invention to the removal of visible suspended matters from the water by the successive application of the two reagents described herein, without any intermediate filtration, and the production of a precipitate by the mere union of the two reagents in the water without operating chemically upon the impurities which it is desired to remove.

Having thus set forth my invention, what I claim as new, and desire to secure by Letters Patent, is—

1. The process herein shown and described for removing visible suspended impurities in a moving current of water under pressure, consisting in forming a precipitate of carbonate of lime therein by separately injecting into such moving current the elements of the lime carbonate and removing the precipitate thus formed, substantially as set forth.

2. The process herein shown and described for removing visible suspended impurities in a moving current of water under pressure, consisting, first, in dissolving carbonic acid in the water, and then, without filtration, mingling lime with such acidulated water, and then filtering the water to remove the carbonate of lime and the impurities commingled therewith, as and for the purpose set forth.

3. The process herein shown and described for precipitating the impurities in a moving current of water under pressure in a closed pipe, consisting, first, in preparing a specific solution of carbonic acid in water; secondly, feeding such acidulated water into the moving current of impure water; thirdly, diffusing such acidulated water in the impure water, and, fourthly, feeding lime-water into the same moving current of water, as and for the purpose set forth.

4. The process herein shown and described for precipitating the impurities in a moving current of water under pressure in a closed pipe, consisting, first, in feeding a continuous charge of carbonated water of specific strength into the moving current in the closed pipe; secondly, diffusing such carbonated water in the contents of the pipe, and, thirdly, feeding a specific charge of lime into the same current, as and for the purpose set forth.

5. The process herein shown and described for precipitating impurities in water, consisting, first, in mingling carbonic-acid gas with a spray of water; secondly, collecting such water and mingling it with the impure water; and, thirdly, in supplying a suitable charge of lime to the water to form carbonate of lime with the diffused carbonic acid, as and for the purpose set forth.

6. The method herein shown and described for precipitating the impurities in water, consisting, first, in generating carbonic acid by the combustion of carbon; secondly, in mingling the products of such combustion with a spray of water in a closed vessel; thirdly, in discharging the nitrogen and excess of carbonic acid from such vessel and collecting the carbonated water; fourthly, in mingling such carbonated water with the impure water, and, fifthly, in feeding a suitable supply of lime-water to the impure water to combine with the carbonic acid and form carbonate of lime, as and for the purpose set forth.

7. The method herein shown and described for precipitating the impurities in a moving current of water under pressure, consisting, first, in generating carbonic acid by the combustion of carbon; secondly, in forcing the products of such combustion into contact with a spray of water in a closed vessel; thirdly, in collecting such carbonated water and pumping it into the impure water-pipe in a definite proportion; fourthly, in diffusing such carbonated water in the impure water; fifthly, in pumping lime-water into such acidulated impure water in a definite proportion, and, sixthly, in removing the precipitate thus formed, as and for the purpose set forth.

8. The method of forming a precipitate of lime in impure water, consisting, first, in generating carbonic acid; secondly, passing a solution of the same through carbonate of lime; thirdly, mingling the compound thus formed with the impure water, and, fourthly, supplying lime in the required proportion to the same.

In testimony whereof I have hereunto set my hand in the presence of two subscribing witnesses.

JOHN W. HYATT.

Witnesses:
CHAS. C. MCBRIDE,
THOS. S. CRANE.